(12) United States Patent
Uneme et al.

(10) Patent No.: US 6,634,062 B2
(45) Date of Patent: Oct. 21, 2003

(54) FRICTIONAL HINGE DEVICE AND A PORTABLE BUSINESS MACHINE INTO WHICH THE FRICTIONAL HINGE DEVICE IS INCORPORATED

(75) Inventors: Masato Uneme, Nagoya (JP); Takaaki Hayashida, Nagoya (JP)

(73) Assignee: Chuo Hatsujo Kabushiki Kaisha, Aichi-Ken (JP)

( * ) Notice: Subject to any disclaimer, the term of this patent is extended or adjusted under 35 U.S.C. 154(b) by 160 days.

(21) Appl. No.: 09/742,330

(22) Filed: Dec. 22, 2000

(65) Prior Publication Data

US 2001/0027589 A1 Oct. 11, 2001

(30) Foreign Application Priority Data

Dec. 24, 1999 (JP) .......................................... 11-368026

(51) Int. Cl.$^7$ .............................................. E05D 11/08

(52) U.S. Cl. ...................................................... 16/342

(58) Field of Search ........................ 16/342, 341, 337, 16/338, 339; 361/680, 681; 379/433.13

(56) References Cited

U.S. PATENT DOCUMENTS

| | | | | |
|---|---|---|---|---|
| 4,489,447 A | * | 12/1984 | Umehara ..................... | 16/342 |
| 5,038,746 A | * | 8/1991 | Rice ........................ | 125/11.04 |
| 5,206,790 A | * | 4/1993 | Thomas et al. ............. | 361/681 |
| 5,406,678 A | * | 4/1995 | Kaden et al. ............... | 16/342 |
| 5,456,538 A | * | 10/1995 | Honda et al. ............... | 384/450 |
| 5,509,176 A | * | 4/1996 | Karl ........................ | 16/342 |
| 5,638,579 A | * | 6/1997 | Tenney ..................... | 16/338 |
| 5,771,540 A | * | 6/1998 | Carpenter et al. ........... | 16/308 |
| 5,832,566 A | * | 11/1998 | Quek et al. ................. | 16/342 |

FOREIGN PATENT DOCUMENTS

| | | | |
|---|---|---|---|
| JP | 6-193636 A1 * | 7/1994 | ................. 384/276 |

OTHER PUBLICATIONS

Marks' Standard Handbook for Mechanical Engineers: Avallone et al, 1996, McGraw–Hill, 10$^{th}$ Ed., p. 13–69.*
JISB0621, "Definitions and Designations of Geometrical Deviations," 1984.
JISB7451, "Instruments for the Assessment of Departure from Roundness—Measurement of Variations in Radius," 1997.
JISB0601, "Geometrical Product Specifications (GPS)—Surface Texture: Profile Method—Terms, Definitions and Surface Texture Parameters," 2001.
JISB0651, "Geometrical Product Specifications (GPS)—Surface Texture: Profile Method—Nominal Characteristics of Contact (Stylus) Instruments," 2001.

* cited by examiner

Primary Examiner—Anthony Knight
Assistant Examiner—Doug Hutton
(74) Attorney, Agent, or Firm—Morgan, Lewis & Bockius LLP

(57) ABSTRACT

In a frictional hinge device, a diameter-increased section 11 of a rotation shaft 10 is formed so that the surface roughness (Ra) is 0.05~0.20 $\mu$m in the circumferential direction, and the surface roughness (Ra) in the axial direction is 0.15~0.30 $\mu$m. A relationship between a deviation "P-P" and an innermost dent V is defined as P-P<2.5 $\mu$m and V<1.0 $\mu$m. With the use of synthetic resin (PC, PAR, PPS, e.t.c.), a support block 20 is provided integrally around the rotation shaft 10. The support block 20 tightly engages with the rotation shaft 10 due to a residual stress based on a shrinkage allowance appeared when molding the synthetic resin. With a good deviation "P-P", a shallower innermost dent V and a smaller surface roughness in the circumferential direction, a stable surface friction is maintained for an extended period time with the least amount of wear. By making the surface roughness (Ra) in the circumferential direction smaller by 0.1~0.2 $\mu$m than the surface roughness (Ra) in the axial direction, the stable torque is positively insured with no initial scratch and no stickslip.

4 Claims, 18 Drawing Sheets

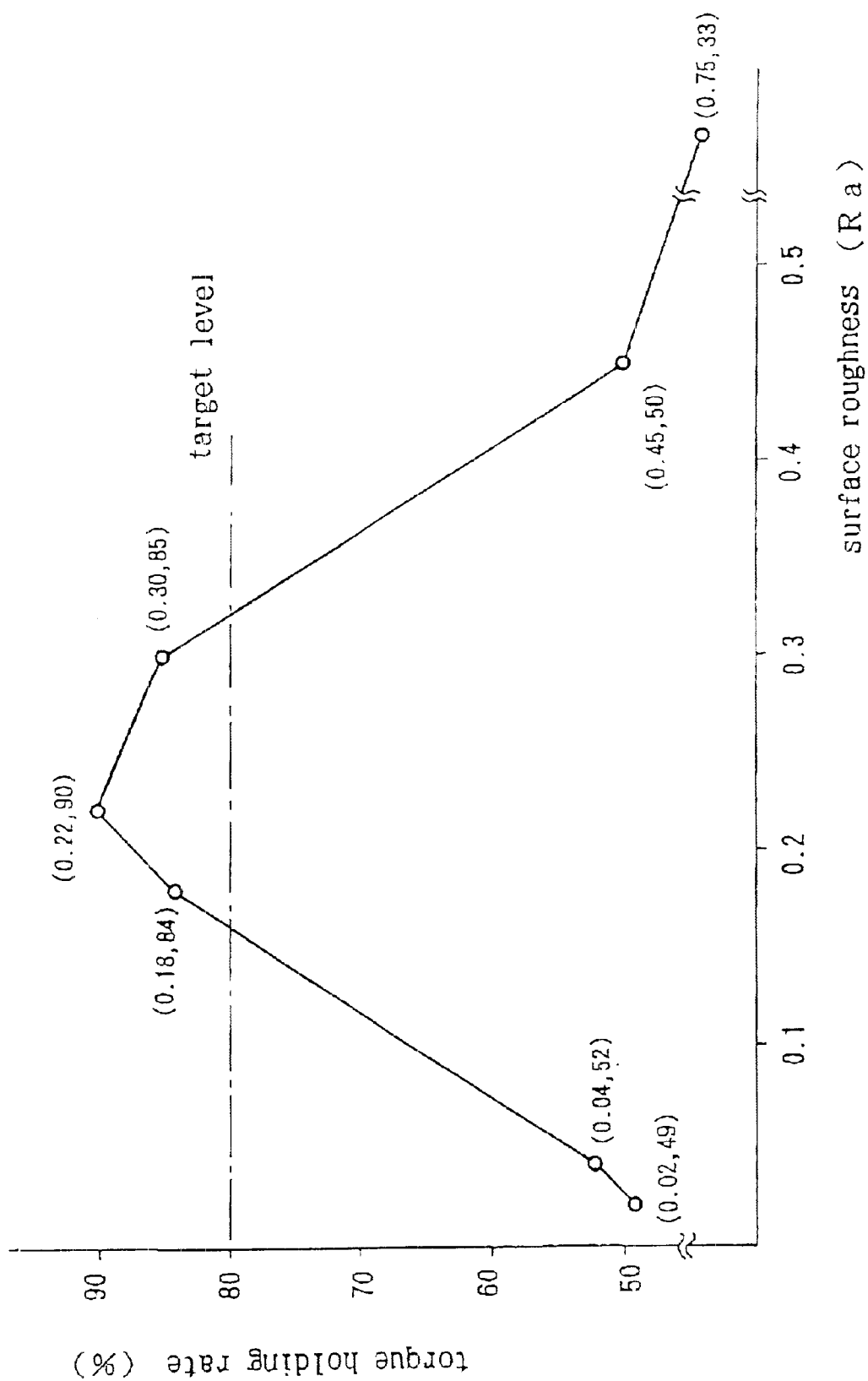

schematic measurement view cut-off value : R50
diameter of probe end : 50 μm
measurement speed : 4 rpm S
outermost shift (P) due to chipping
innermost dent (V)
(P-P)

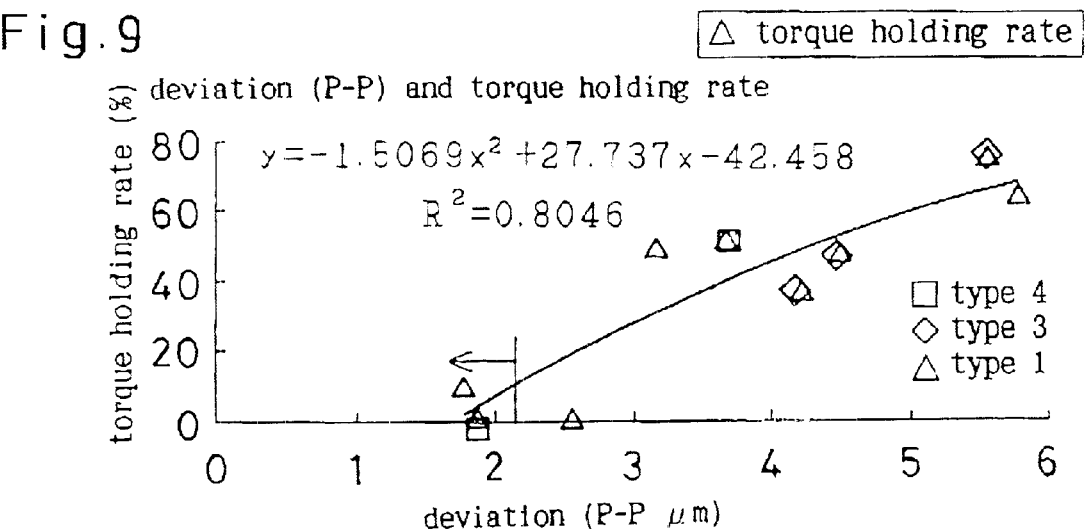
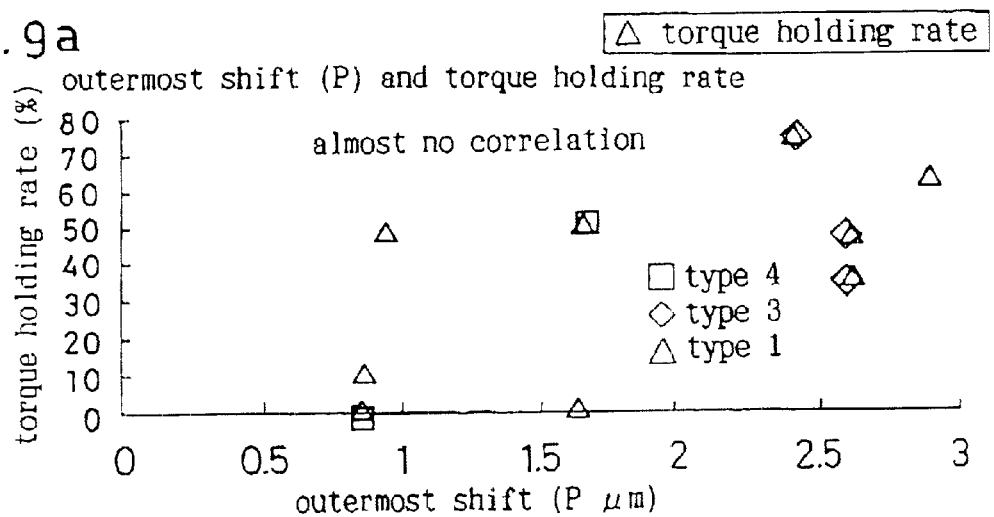
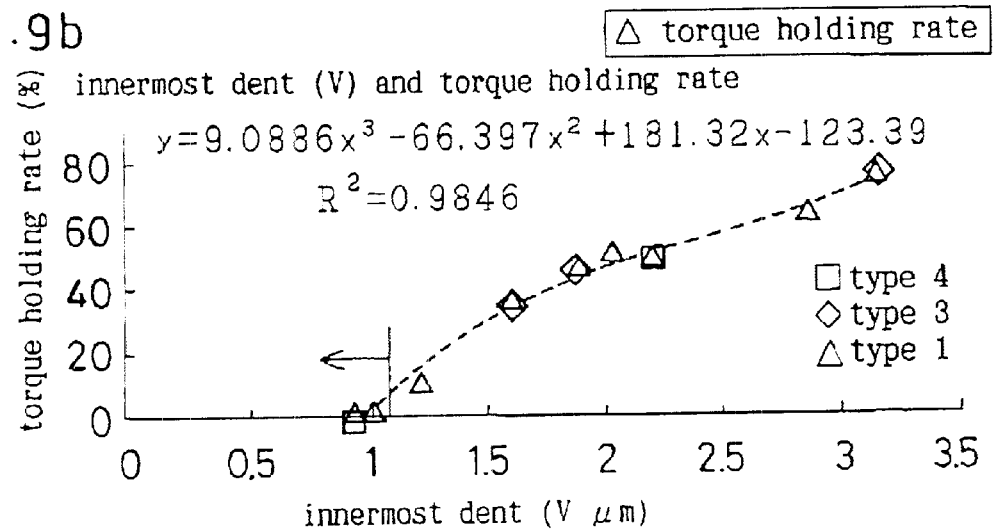

FRICTIONAL HINGE DEVICE AND A PORTABLE BUSINESS MACHINE INTO WHICH THE FRICTIONAL HINGE DEVICE IS INCORPORATED

BACKGROUND OF THE INVENTION

1. Field of the Invention

The invention relates to a frictional hinge device used to pivotably support and hold a lid plate and a display of a portable business machine such as a laptop note type personal computer or the like at desired pivotal positions, and concerns to a portable business machine into which the frictional hinge device incorporated.

2. Description of Prior Art

In a conventional frictional hinge device incorporated into a laptop note type personal computer, frictional torque is used to hold a lid plate or a display of the personal computer at any pivotal positions. A support block is made of a synthetic resin and integrally molded with a metallic shaft. Due to a surface friction between the support block and the metallic shaft, the metallic shaft is held at the desired pivotal position while permitting the metallic shaft to pivot freely relative to the support block against the surface friction therebetween.

However, when an engagement relationship between the metallic shaft and the support block is not relevant, there arises no smaller variations on torque upon pivotally moving the metallic shaft relative to the support block. This induces abnormal noise due to a stickslip phenomenon when pivoting the metallic shaft relative to the support block, whereby decreasing the frictional torque to lose a good endurance due to an unacceptable amount of wear between the metallic shaft and the support block.

In order to overcome these inconveniences, a surface treatment (surface roughness e.t.c.,) against the metallic shaft member has been analyzed. The analyses has been directed only to the surface roughness of the metallic shaft in an axial direction, but not in a circumferential direction.

Almost no regard has been paid to a deviation from circular form and the surface roughness of the metallic shaft in the circumferential direction because cutting and buffing procedures are routinely implementing in machining revolution work pieces.

The inventors have been delving into the relationship between the metallic shaft and the support block, and as a consequence found it important to define a relevant relationship among the deviation from circular form and the surface roughness of the metallic shaft in both the circumferential and axial directions in order to improve the endurance capable of maintaining an appropriate torque for a long period of time.

Therefore, the present invention has been made with the above drawbacks in mind, it is a main object of the invention to provide a frictional hinge device which is capable of maintaining a stable frictional resistance between a shaft member and a support member for an extended period of time when holding the shaft member at desired pivotal positions upon opening and closing a lid plate or the like.

It is also an object of the invention to provide a portable business machine into which the frictional hinge device is incorporated.

SUMMARY OF THE INVENTION

With a support member made of a resin molded to surround a shaft member, the support member tightly engages with the shaft member due to a residual stress based on a shrinkage allowance after molding the support member in integral with the shaft member. During the molding process, the synthetic resin is injected into a die mold in which the shaft member was beforehand placed.

When a surface frictional resistance appeared between the support member and the shaft member is smaller than an exterior torque to which the shaft member is subjected, the shaft member pivotally moves relative to the support member. When the surface frictional resistance exceeds the exterior torque, the shaft member is held at a desired pivotal angle due to the surface frictional resistance.

With the support member and the shaft member molded integrally, the frictional hinge device is manufactured less costly.

An outer surface of the shaft member is cylindrically finished by means of extruding and cutting procedures. With the result of the inventors' research and observation, when an innermost shift position (innermost dent V) against a true circle is more than 1.0 $\mu$m, the inventors found that a torque holding rate abruptly falls so as to decline the endurance. This is true when a deviation "P-P" from a circular form is more than 2.5 $\mu$m. The deviation "P-P" is defined by a difference between an outermost shift position and the innermost shift position with respect to a referential center circle of an outer surface of the shaft member.

With the innermost dent V and the deviation "P-P" expressed as V<1.0 $\mu$m and P-P<2.5 $\mu$m, the shaft member is demanded to be treated so that the deviation from a circular form highly decreased. By finishing the shaft member to meet the above requirement through a quality control, a frictional hinge device superior in endurance is provided.

A surface roughness Ra of the shaft member decreases with the decrease of the deviation from a circular form. When there is no ruggedness on the finished surface of the shaft member, the support member tightly engages with the shaft member to coagulate at an engagement surface between the resin of the support member and the shaft member.

In order to avoid the coagulation against the resin, the shaft member is treated so that its surface roughness Ra is 0.05~0.20 $\mu$m in the circumferential direction.

With this treatment, a smooth outer surface of the shaft member is insured while avoiding the coagulation against the resin. This insures an appropriate lubrication at the engagement surface between the support member and the shaft member, thereby preventing the abnormal noise from inducing when pivoting the shaft member relative to the support member.

With the shaft member having 0.15~0.30 $\mu$m as the surface roughness Ra in the axial direction which is greater than the surface roughness Ra in the circumferential direction, a needed magnitude of friction is readily determined. This avoids the abnormal noise from inducing due to the slipstick when pivoting the shaft member relative to the support member while suppressing the wear between the shaft member and the support member, thereby repeatedly holding the shaft member at the desired pivotal positions for an extended period of time.

It is to be noted that various buffing treatments are used to the outer surface of the shaft member so that the surface roughness in the axial direction is greater than the surface roughness in the circumferential direction.

With the portable business machine into which the frictional hinge device is incorporated, a stable torque is maintained with the least amount of wear, which is capable of repeatedly holding a display-mounted lid plate member at the desired pivotal positions for an extended period of time.

BRIEF DESCRIPTION OF THE DRAWINGS

A preferred form of the present invention is illustrated in the accompanying drawings in which:

FIG. 4 is a characteristics showing a relationship between a surface roughness and a torque holding rate represented after operating the frictional hinge device by predetermined times in order to describe an efficiency.

FIGS. 9, 9a and 9b are a graphical representation showing a relationship between the torque holding rate and the deviation from circular form;

DETAILED DESCRIPTION OF THE PREFERRED EMBODIMENTS

Figure 1:
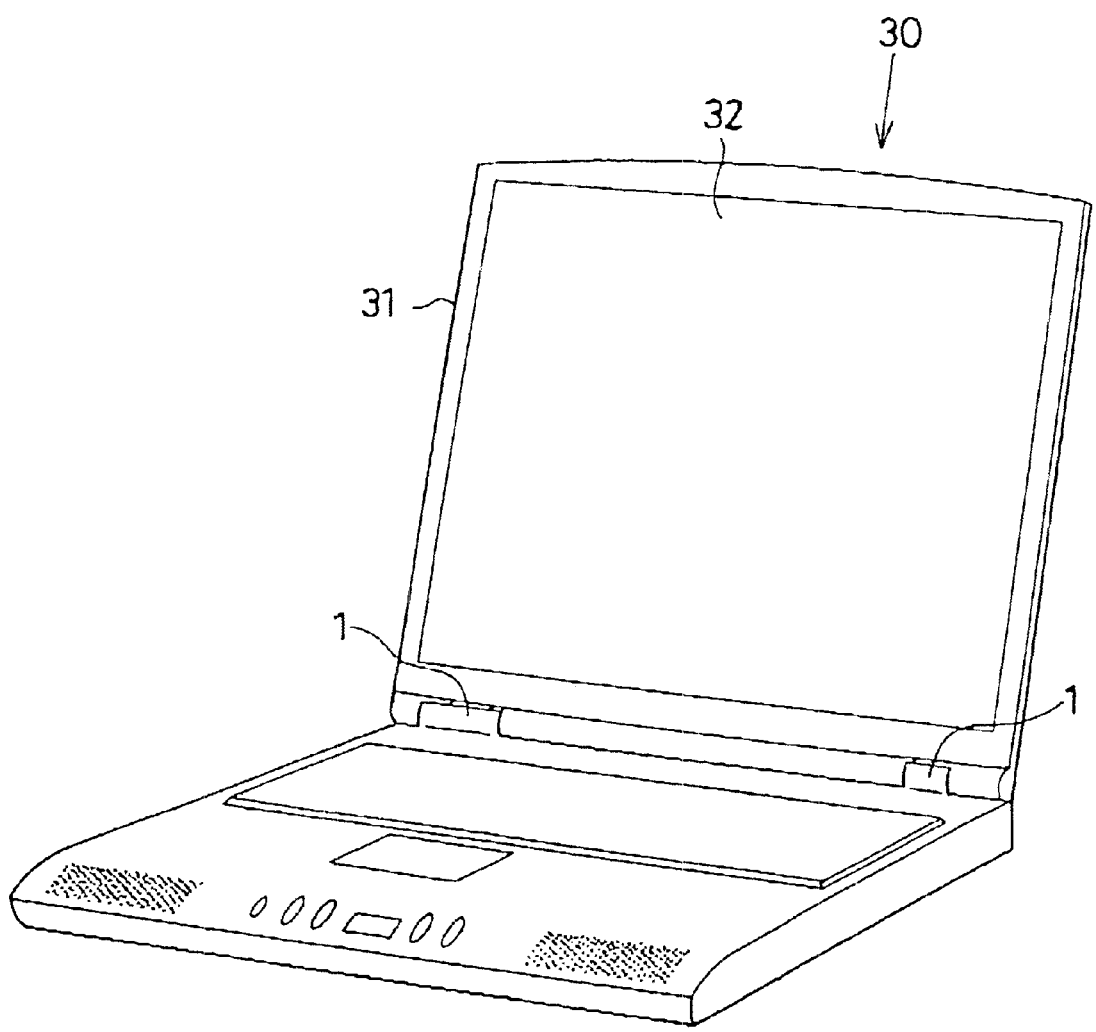
FIG. 1 is a perspective view of a laptop note type personal computer into which a frictional hinge device is incorporated according to a first embodiment of the invention.

Referring to FIGS. 1 through 14 which depict about a frictional hinge device 1 according to a first embodiment of the invention. As shown in FIG. 1, the frictional hinge device 1 is incorporated into a laptop note type personal computer 30 (portable business machine) to pivotally move a lid plate 31 for a liquid crystal display 32 so as to hold the lid plate 31 at desired pivotal positions.

Figure 1A:
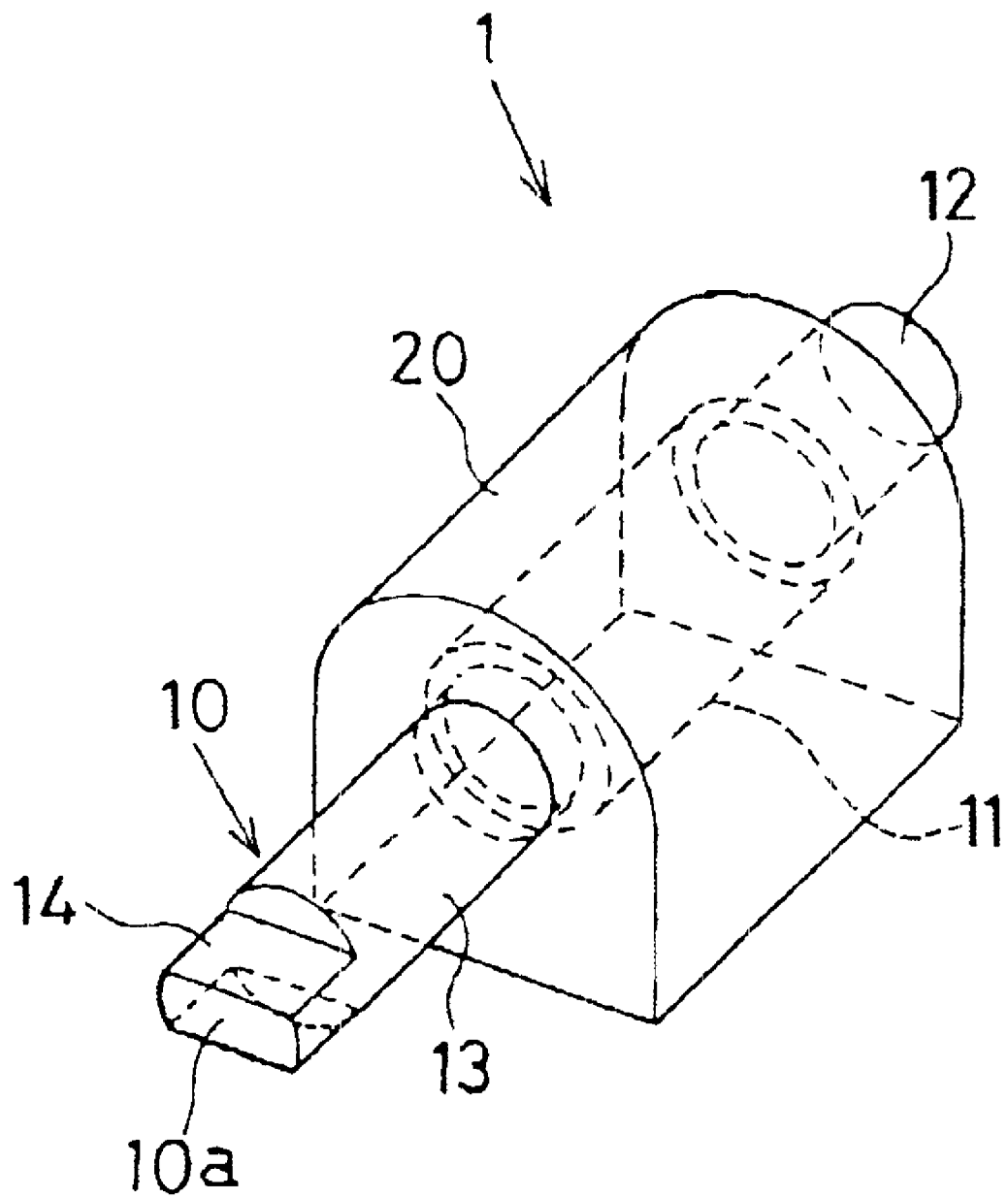
FIG. 1a is a perspective view of the frictional hinge device.

The frictional hinge device 1 pivotably connects the lid plate 31 to a main body of the personal computer 30. As shown in FIG. 1a, the frictional hinge device 1 has a rotation shaft 10 having a rotational axis 10a as a rotational center. The rotation shaft 10 is secured to the lid plate 31 of the personal computer 30 to pivotally move in unison with the lid plate 31. A support block 20 is provided with the main body of the personal computer 30 to pivotally support the rotation shaft 10.

As an alternative, the support block 20 may be mounted on the lid plate 31 and the rotation shaft 10 is secured to the main body of the personal computer 30.

Figure 2:
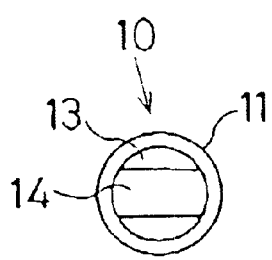
FIG. 2 is a plan view of a shaft member of the frictional hinge device.
Figure 2A:
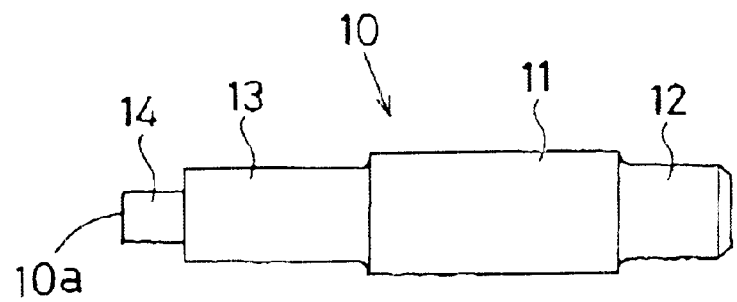
FIG. 2a is a side elevational view of the shaft member of the frictional hinge device.

As depicted in FIGS. 2 and 2a, the rotation shaft 10 is made of steel or stainless steel (SUS) to form a bar-shaped configuration. The rotation shaft 10 has a diameter-increased section 11 (e.g., 5 mm in diameter) in middle portion and diameter-reduced sections 12, 13 (e.g., 4 mm in diameter) in right and left end sides. The left ended diameter-reduced section 13 has a dowel 14 to connectedly interfit into the lid plate 30.

Figure 3:
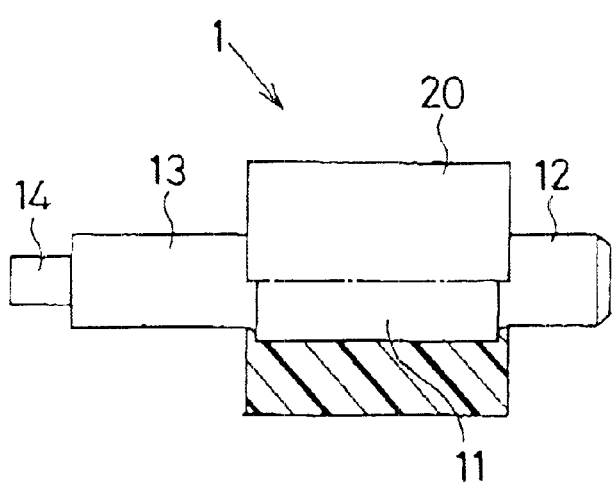
FIG. 3 is a side elevational view of the frictional hinge device, but partly sectioned longitudinally.
Figure 3A:
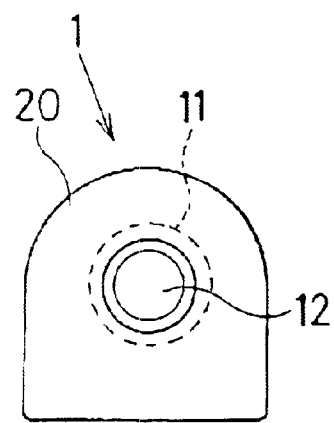
FIG. 3a is a plan view of the frictional hinge device.

As shown in FIGS. 3 and 3a, the support block 20 is formed by a synthetic resin which tightly engages with an outer surface of the diameter-increased section 11 of the rotation shaft 10. In this instance, the synthetic resin powder is injected into a die mold (heated to about 165° C.) in which the rotation shaft 10 was placed beforehand.

The frictional hinge device 1 holds the lid plate 30 at any angle against the main body of the personal computer 30. For this reason, it is necessary to hold the lid plate 31 at the desired angles when a relative torque of the rotation shaft 10 against the support block 20 is less than a predetermined value. While it is necessary to provide a smooth pivotal movement with the rotation shaft 10 when the relative torque is greater than the predetermined value.

In more tangible terms, it is required for the rotation shaft 10 to insure a stable torque of about 1~20 kgf·cm while it is necessary to insure about 50,000 times of open and closure operation as an endurable limit when an open and closure operation of the lid plate 31 is counted. When 50,000 times of the open and closure operation is counted, it is requisite that a torque holding rate must be 80% or more of an initial torque represented by the first open and closure operation of the lid plate 31.

In this instance, the torque holding rate is expressed as follows:

$$\text{Torque holding rate (\%)} = \{(\text{relative torque deteriorated due to heat or endurable limit})/(\text{initial torque})\} \times 100$$

In order to satisfy the above requirements, researches have been carried out to seek an optimum surface roughness (Ra) at the outer surface of the diameter-increased section 11 of the rotation shaft 10. As shown in FIG. 4, it is necessary to insure the surface roughness (Ra) of not 0.02~0.08 μm but 0.15~0.30 μm in order to obtain the torque holding rate of 80% or more of the initial torque when the needed times of open and closure operation is counted. When the surface roughness (Ra) is minute, the torque variations increase while accompanying creaking noise due to the stickslip during the open and closure operation.

In this instance, the surface roughness (Ra) was measured by the method stipulated by JISB0651 and expressed by the definition stipulated by JISB0601.

When the surface roughness (Ra) is 0.35 μm or more, the rotation shaft 10 thickly scratches against the support block 20 due to the increased stickslip. This increasingly wears the support block 20 so that the residual stress is lost due to the shrinkage allowance when about 1,000 times of the open and closure operation is counted.

With the above experimental test results in mind, the optimum surface roughness (Ra) is represented by 0.15~0.30 μm at the outer surface of the diameter-increased section 11 of the rotation shaft 10.

As a synthetic resin, PAR (polyarylate) is used to the support block 20 with the diameter-increased section 11 as 5 mm in diameter and the diameter-reduced section 12 as 4 mm in diameter.

Figure 5:
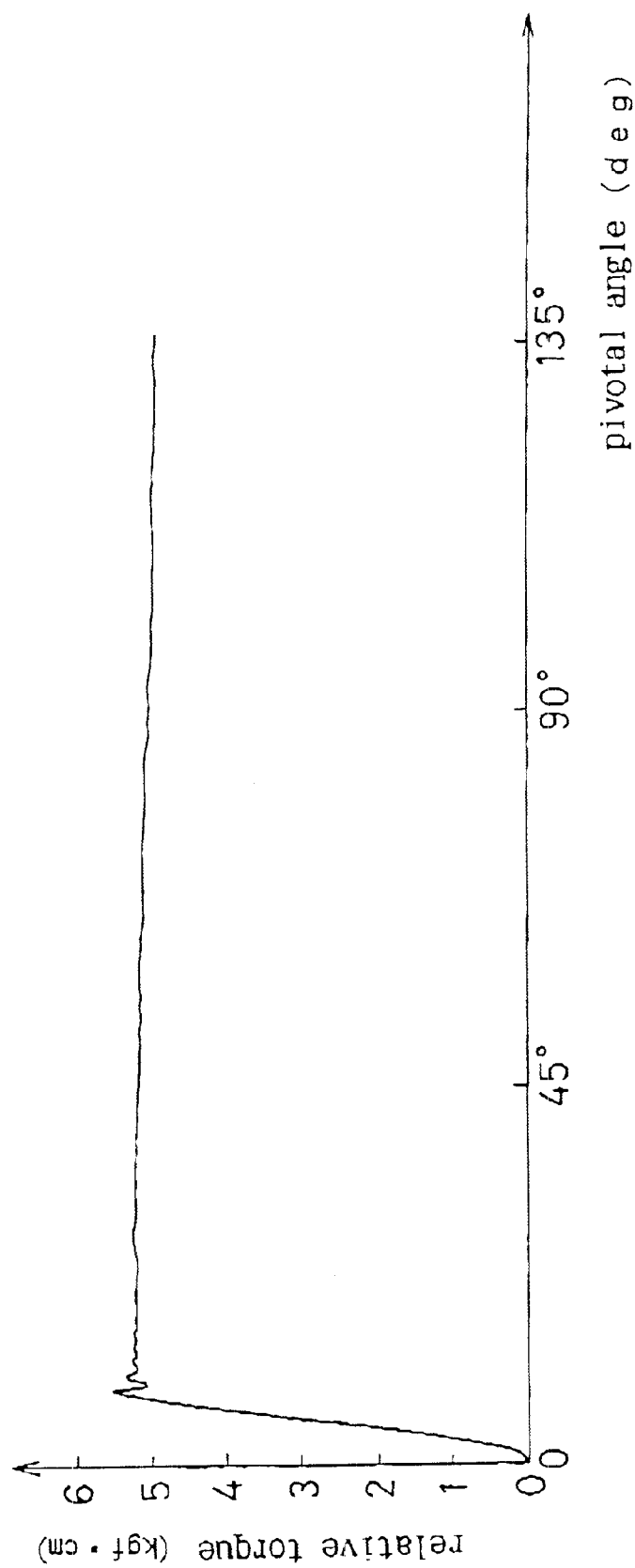
FIG. 5 is a characteristics showing a relationship between a pivotal angle and a torque when providing an optimum surface roughness with the shaft member.

FIG. 5 shows a relationship between a pivotal angle and the relative torque during the process in which the rotation shaft 10 pivotally moves to open and close the lid plate 31 with the surface roughness (Ra) in the axial direction as 0.18 μm.

Figure 6:
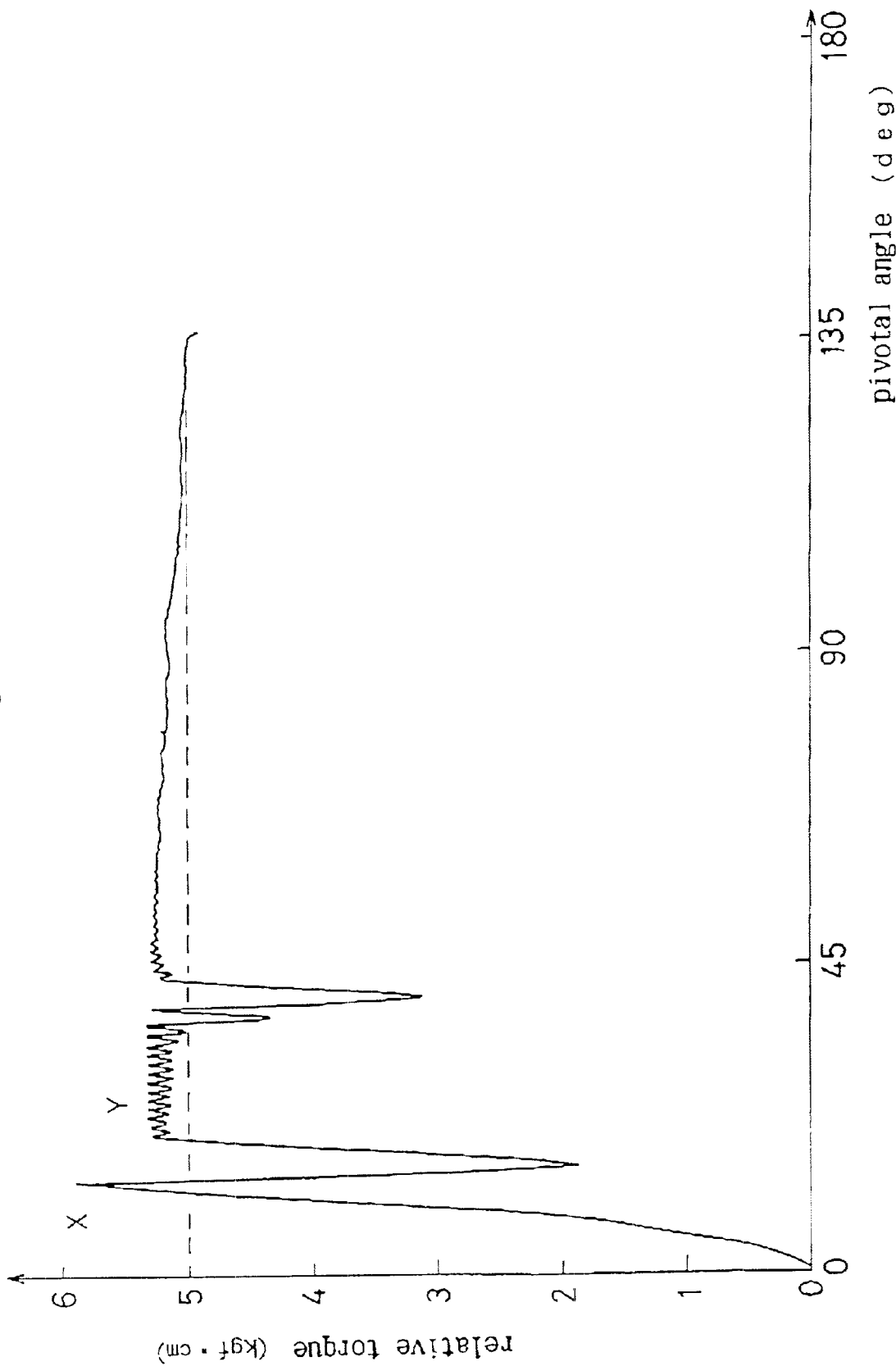
FIG. 6 is a characteristics showing a relationship between the pivotal angle and torque when providing a greater surface roughness with the shaft member.

FIG. 6 shows a relationship between the pivotal angle and the relative torque with the surface roughness (Ra) as 0.75 μm for the purpose of comparison.

Figure 7:
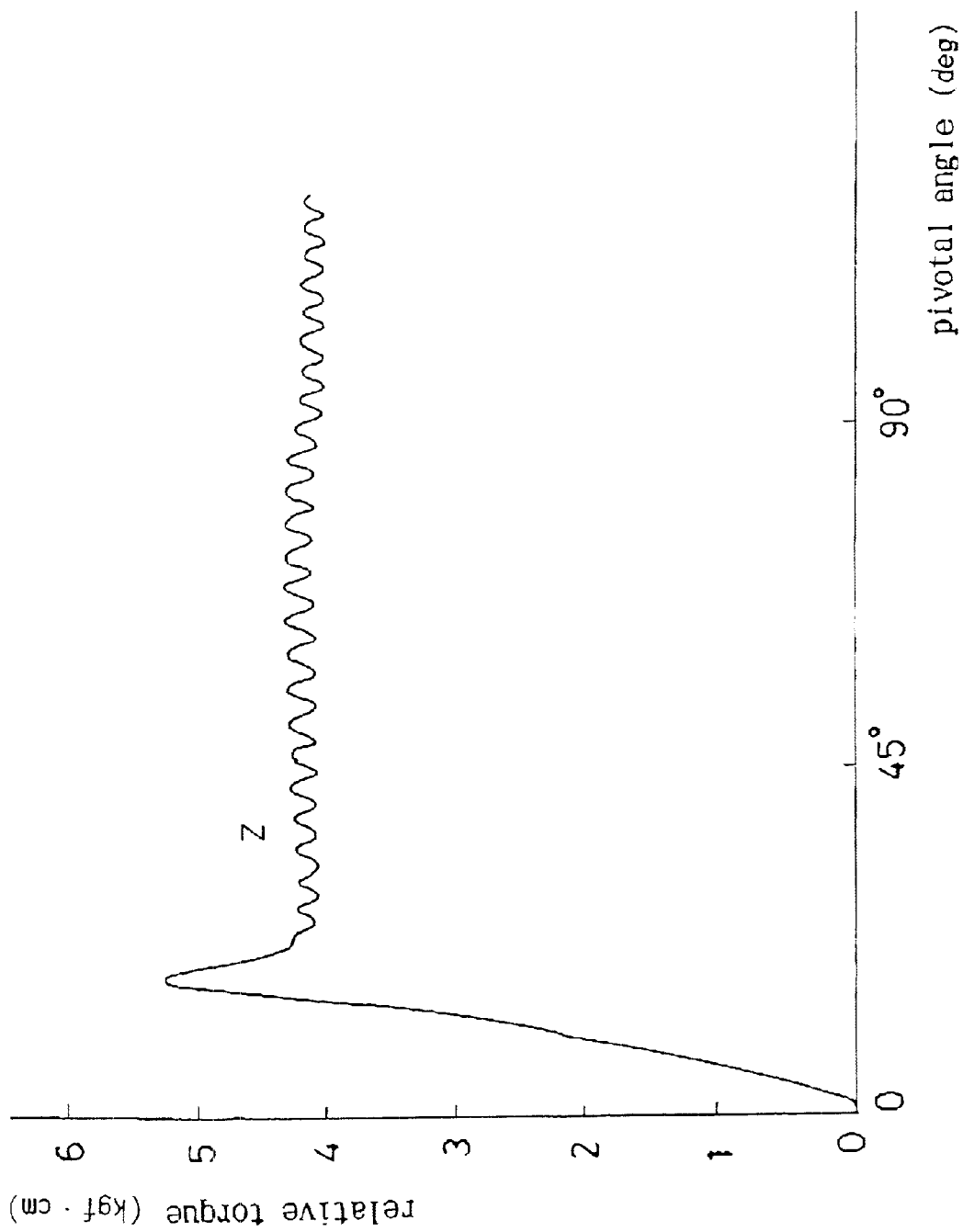
FIG. 7 is a characteristics showing a relationship between the pivotal angle and torque when providing the shaft member with a smaller surface roughness.

FIG. 7 shows a relationship between the pivotal angle and the relative torque with the surface roughness (Ra) as 0.02 μm and 0.04 μm for the purpose of comparison.

When the surface roughness (Ra) in the axial direction is 0.75 μm, the rotation shaft 10 thickly scratches initially against the support block 20 with a greater stickslip as denoted at X, Y in FIG. 6 as the rotation shaft 10 starts to pivotally move. When the surface roughness (Ra) is 0.18 μm, the scratch and stickslip are inappreciably slight as shown in FIG. 5.

When the surface roughness (Ra) reduces to 0.02 μm, 0.04 μm, the stickslip increases as shown by Z in FIG. 7.

Table 1 lists up the relative torque, stickslip and scratch against variety of the surface roughnesses (Ra).

TABLE 1

| | (I) | (II) | (III) | (IV) |
|---|---|---|---|---|
| ① | 0.75 μm | 4.9 kgf · cm | 0.2 kgf · cm | 3.0 kgf · cm |
| | | 5.2 kgf · cm | 0.2 kgf · cm | 4.0 kgf · cm |
| ② | 0.18 μm | 4.9 kgf · cm | ≦ 0.1 kgf · cm | 0.4 kgf · cm |
| | | 5.1 kgf · cm | | 1.4 kgf · cm |

TABLE 1-continued

| | (I) | (II) | (III) | (IV) |
|---|---|---|---|---|
| ③ | 0.02 μm | 4.8 kgf · cm | 0.2~0.3 kgf · cm | 1.0 kgf · cm |
| | 0.04 μm | | | |

Note:
the rotation shaft: 4 mm in diameter
the support block made of PAR (polyarylate)
① represents a greater surface roughness.
② represents the present invention.
③ represents a smaller surface roughness.
(I) represents the surface roughness in the axial direction.
(II) represents an average relative torque.
(III) represents the stickslip while the rotation shaft pivots around the support block.
(IV) represents the initial scratch.

In addition to the researches regarding the torque holding rate and the surface roughness (Ra) in the axial direction, the inventors have studied the surface roughness (Ra) in the circumferential direction and the deviation from circular form in relation to the diameter-increased section 11 of the rotation shaft 10 in order to maintain a stable torque holding rate.

Upon studying the torque holding rate and the deviation from circular form, the inventors paid their attention to an innermost shift position (innermost dent V) against a true circle S (e.g., true circle having a target diameter) and an outermost shift position (outermost shift P) against the true circle S (referential center circle) in relation to the diameter-increased section 11 of the rotation shaft 10.

As a results, following formulas are obtained regarding the innermost dent V and the deviation "P-P" represented by the difference between the outermost shift P and the innermost dent V in order to maintain a higher torque holding rate.

$$V < 1.0 \, \mu m$$

$$P\text{-}P < 2.5 \, \mu m$$

Figure 8:
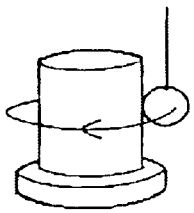
FIG. 8 is a schematic view of the shaft member showing how to measure a deviation from circular form.

FIG. 8 shows a schematic view to measure the deviation from circular form in relation to the rotation shaft 10 in order to introduce the above relationship.

Figure 8A:
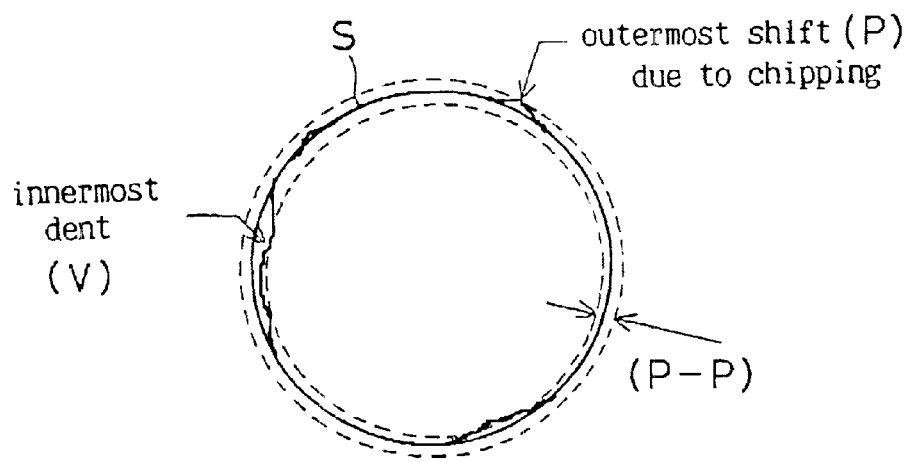
FIG. 8a is a latitudinal cross section of the shaft member depicted to show an outermost shift P, the deviation "P-P" from circular form and an innermost dent V.

FIG. 8a shows a relationship between the outermost shift P (outermost shift position) and the innermost dent V (innermost shift position) against the true circle S. The measurements are based on the method stipulated by JISB7451 and the deviation is in accordance with the definition stipulated by JISB0621.

Table 2 shows measurement values regarding specimens used to introduce the above formulas.

In Table 2, hinge type No. indicates a die mold number and specimen No. denotes a specimen number based on each of the die mold numbers in which nine types of specimens was formed as a total with respect to three types of die molds.

TABLE 2

| hinge type No. | type 1 | | | | type 2 | | | type 3 | |
|---|---|---|---|---|---|---|---|---|---|
| specimen No. | 1 | 2 | 3 | 4 | 1 | 2 | 3 | 1 | 2 |
| deviation P-P | 2.56 | 1.77 | 3.16 | 5.78 | 4.49 | 5.57 | 4.22 | 3.83 | 1.86 |
| outermost shift P | 1.62 | 0.88 | 0.94 | 2.9 | 2.61 | 2.42 | 2.62 | 1.65 | 0.85 |
| innermost dent V | 0.94 | 1.22 | 2.21 | 2.87 | 1.88 | 3.15 | 1.60 | 2.03 | 1.01 |
| torque holding rate (%) | 99.6 | 90.5 | 52.0 | 47.5 | 53.8 | 25.4 | 64.3 | 50 | 100 |

Note:
Measurement unit is μm.

FIG. 9 shows a relationship between the torque holding rate and the deviation "P-P" represented by the difference between the outermost shift P and the innermost dent V As apparent from FIG. 9, the torque holding rate stays small so long as the deviation "P-P" is small, and the torque holding rate increases in proportion with the increase of the deviation "P-P" regardless of the die mold used herein. As a consequence, the torque holding rate was found to decrease as the deviation "P-P" becomes superior in which the difference between the outermost shift P and the innermost dent V becomes smaller.

FIG. 9a shows a relationship between the torque holding rate and the outermost shift P. As apparent from FIG. 9a, almost no correlation was found between the torque holding rate and the outermost shift P. It is not possible to improve the torque holding rate only by suppressing the outermost shift P. This is because the outermost shift P was introduced as chipping during the machining procedures and found only locally in the circumferential direction, and considered to have no perpetual influence on the surface frictional resistance.

FIG. 9b shows a relationship between the torque holding rate and the innermost dent V. The relationship between the torque holding rate and the innermost dent V is more correlated than the relationship the torque holding rate and the deviation "P-P" as depicted in FIG. 9. The depth of the innermost dent V is considered to profoundly affect on the torque holding rate.

Especially when the innermost dent V is less than 1.0 μm, the torque holding rate becomes exceedingly small. By determining the innermost dent V to be less than 1.0 μm or less, the superior endurance is insured. This is mainly because the recess formed on the outer surface of the rotation shaft 10 has a lengthwise dimension in the axial and circumferential directions to such an extent that the rotation shaft 10 loses a larger chunk of the total volume.

Table 3 shows how the torque holding rate is affected by the deviation "P-P", the innermost dent V and the surface roughness (Ra) in the axial and circumferential directions.

TABLE 3

| specimen No. | deviation P—P | V | surface roughness axial | circum. | torque holding rate after 1,000 times % | estimation |
|---|---|---|---|---|---|---|
| 1 | 3.16 | −2.20 | 0.21 | 0.14 | 52.9 | no good |
| 2 | 5.78 | −2.90 | 0.16 | 0.10 | 37.5 | no good |
| 3 | 2.56 | −0.94 | 0.16 | 0.17 | 99.6 | good |
| 4 | 3.74 | −1.23 | 0.18 | 0.10 | 28.3 | no good |
| 5 | 4.22 | −1.60 | 0.15 | 0.09 | 52.1 | no good |
| 6 | 5.19 | −2.63 | 0.29 | 0.40 | 63.9 | no good |
| 7 | 2.53 | −0.76 | 0.30 | 0.05 | 98.3 | no good (noise) |
| 8 | 3.21 | −0.81 | 0.32 | 0.11 | 99.1 | good |
| 9 | 3.74 | −1.23 | 0.18 | 0.10 | 24.5 | no good |
| 10 | 4.22 | −1.60 | 0.15 | 0.09 | 44.3 | no good |
| 11 | 5.19 | −2.63 | 0.29 | 0.40 | 48.3 | no good |
| 12 | 5.58 | −3.15 | 0.25 | 0.35 | 50.7 | no good |
| 13 | 4.92 | −2.44 | 0.19 | 0.13 | 41.4 | no good |
| 14 | 4.49 | −1.88 | 0.18 | 0.29 | 51.1 | no good |

Note: The deviation and the surface roughness are measured in terms of μm.

As evidenced by the specimen Nos. 1, 2, 4, 5, 9, 10 and 13 in Table 3, the torque holding rate abruptly falls when the innermost dent V is 1.0 μm or more although the surface roughness (Ra) in the circumferential direction is 0.17 μm or less. Due to the reason that the specimen as the surface roughness (Ra) in the circumferential direction is 0.05 μm or less although the specimen No. 7 has the innermost dent V of less than 1.0 μm, the rotation shaft 10 is likely to coagulate against the resin of the support block 20 while inducing the abnormal noise when the rotation shaft 10 pivots around the support block 20.

Following are how to the outer surface of the rotation shaft 10 is treated to insure the appropriate surface roughness (Ra) and the relevant deviation "P-P".

Figure 10:
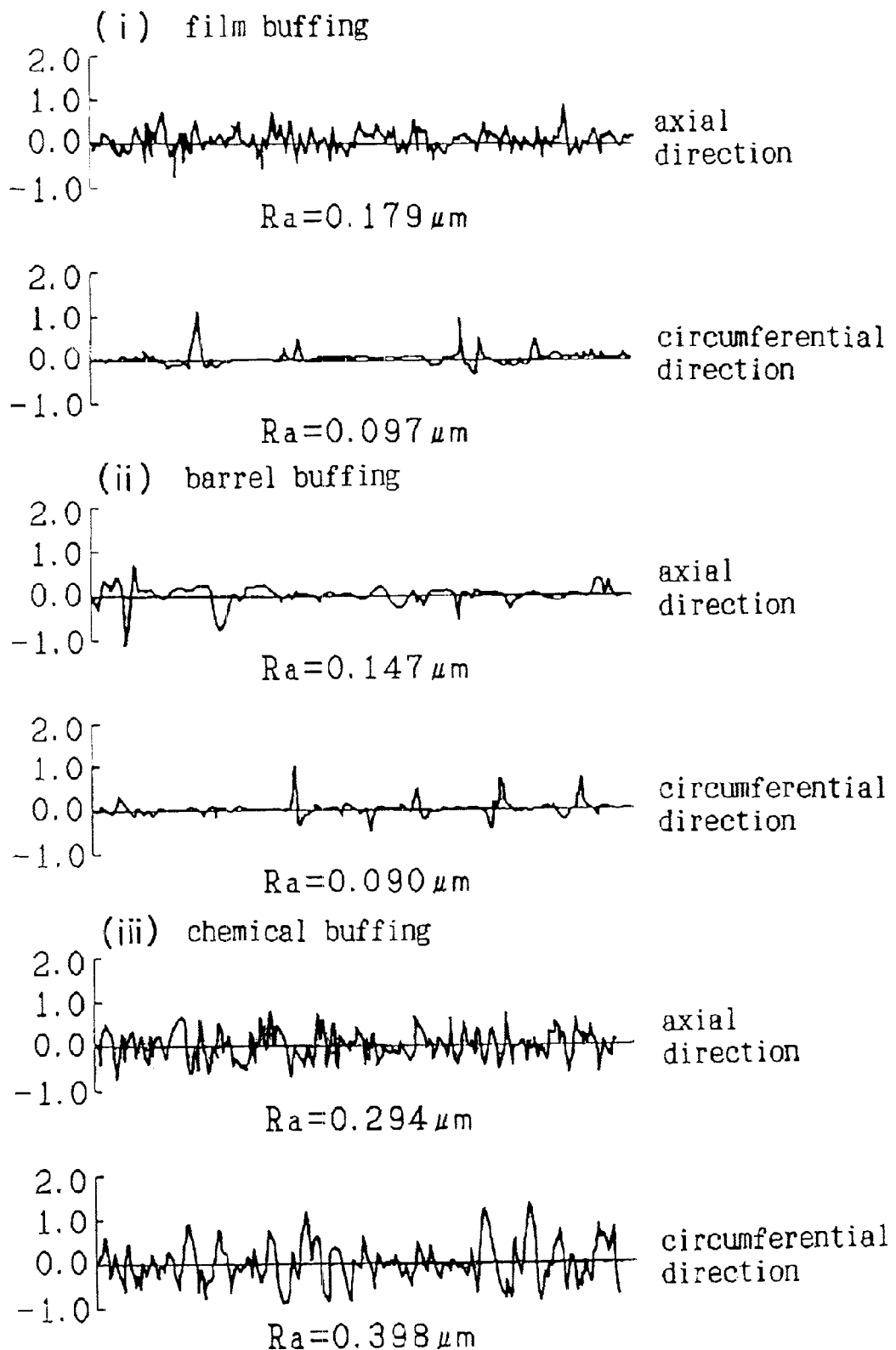
FIG. 10 are results in which surface roughness of the shaft member in axial and circumferential directions are measured in accordance with a film buffing, a barrel finishing and a chemical buffing.
Figure 11:
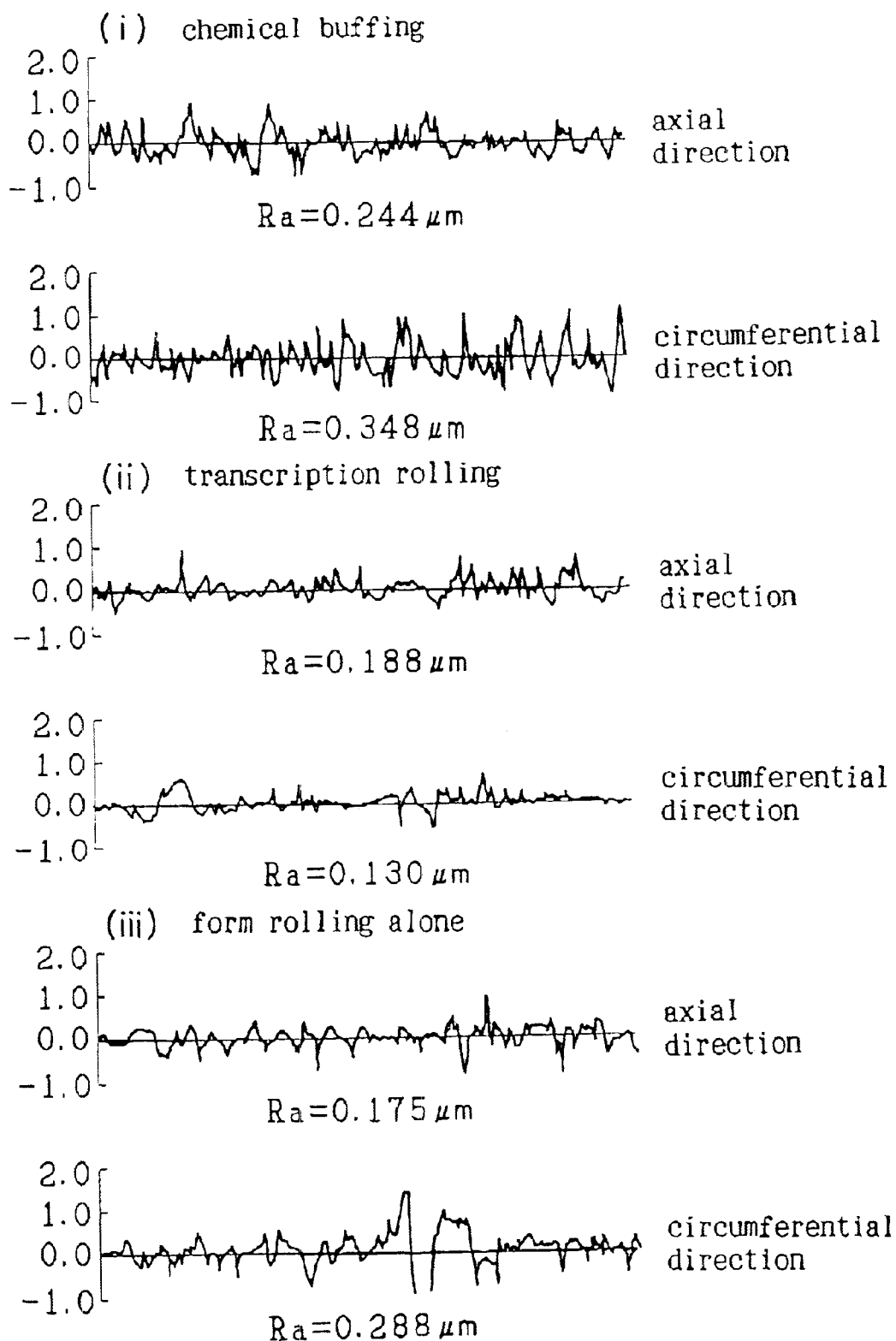
FIG. 11 are results in which surface roughness of the shaft member in axial and circumferential directions are measured in accordance with the chemical buffing, a transcription rolling and a form rolling alone.

Manners in which the rotation shaft 10 is treated in the axial and circumferential directions are shown in FIGS. 10 and 11.

In FIG. 10, a notation (i) depicts when subjected to a film buffing, a notation (ii) depicts when subjected to a barrel buffing, and a notation (iii) depicts when subjected to a chemical buffing.

In FIG. 11, a notation (i) depicts when subjected to the chemical buffing, a notation (ii) depicts when subjected to a transcription rolling, and a notation (iii) depicts when subjected to a form rolling alone.

In any treatments of FIGS. 10 and 11, it is possible to render the surface roughness (Ra) in the circumferential direction smaller by 0.1~0.2 μm than the surface roughness (Ra) in the axial direction.

According to the film buffing shown at (i) in FIG. 10, and the transcription rolling shown at (ii) in FIG. 11, it is apparent to make a numerical difference between the surface roughness (Ra) in the circumferential direction and the surface roughness (Ra) in the axial direction. By determining the surface roughness (Ra) to be 0.05~0.20 μm in the circumferential direction, the torque holding rate decreases to insure a stable torque holding rate for an extended period of time. By rendering the surface roughness (Ra) in the circumferential direction smaller by 0.1~0.2 μm than the surface roughness (Ra) in the axial direction, the stable torque is positively insured between the rotation shaft 10 and the support block 20.

Following are methods how the rotation shaft 10 is formed including the surface treatment described above.

The methods are divided into a plastic working and a cutting procedure.

[1] Plastic Working

Upon implementing the plastic working, a blank of the rotation shaft 10 is extruded so that the relationship is expressed by "P-P"<6~7 μm while the blank is subjected to cold forging, warm forging, hot forging or die casing. Then, the blank is subjected twice or more to a cylindrical grinding and a centerless buffing.

During the grinding and buffing procedures, the blank is roughly machined firstly by 2~3 folds of the deviation "P-P" before milling the blank at the first stage.

At the second and third stages, the blank is finished to insure the relationship as expressed by "P-P"<2.5 μm and V<1.0 μm.

[2] Cutting Procedure

Upon implementing the cutting procedure, the blank of the rotation shaft 10 is cut so that the relationship is expressed by "P-P"<3~4 μm. Then, the blank is subjected to the cylindrical grinding, the centerless buffing or the film buffing to insure the relationship as expressed by "P-P"<2.5 μm.

In this situation, the synthetic resin used to the support block 20 has a smaller changing rate of a bending elasticity (GPa) under an operating temperature ranging from e.g., −20 to 80° C. in order to provide the rotation shaft 10 with a stable frictional resistance.

Figure 12:
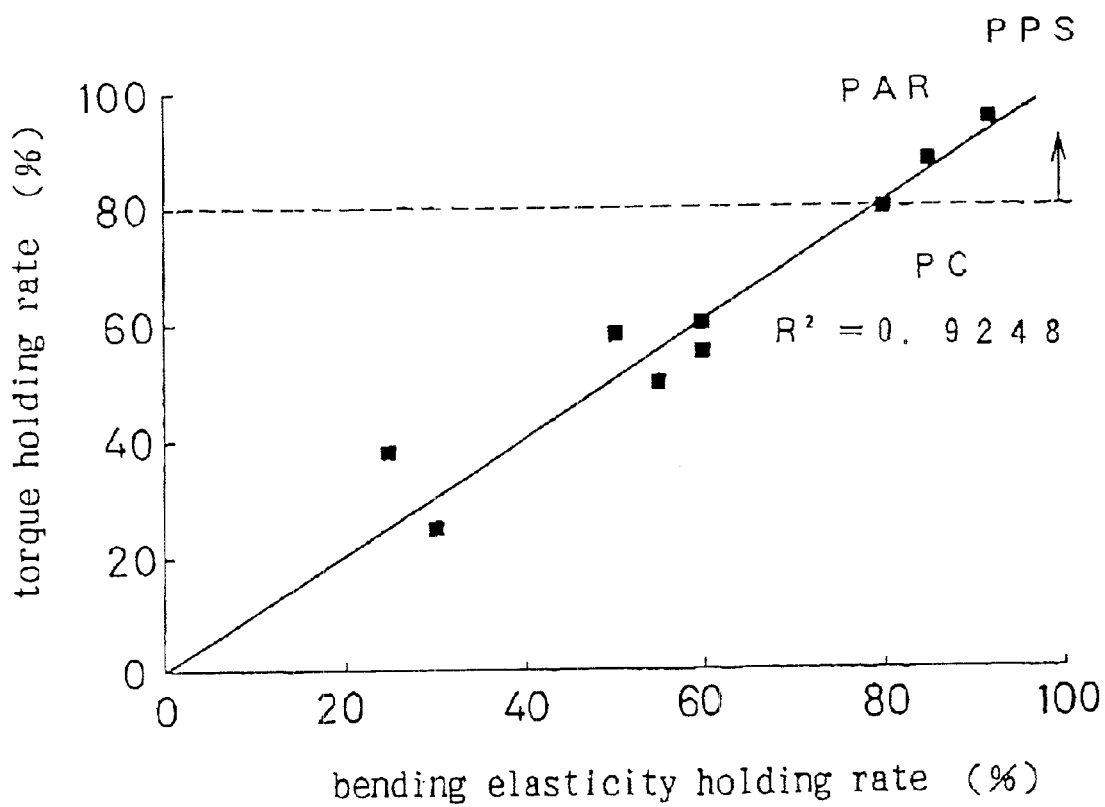
FIG. 12 is a characteristics showing a relationship between a bending elasticity holding rate and torque holding rate on a variety of synthetic resins.

This is based on a research in FIG. 12 which represents a relationship between a torque holding rate and bending elasticity holding rate in which the torque holding rate of 80% or more corresponds to the bending elasticity holding rate of 80% or more. By using the synthetic resin having a higher bending elasticity holding rate (i.e., smaller changing rate of the bending elasticity under the predetermined operating temperature range), it is possible to achieve a higher torque holding rate.

Figure 13:
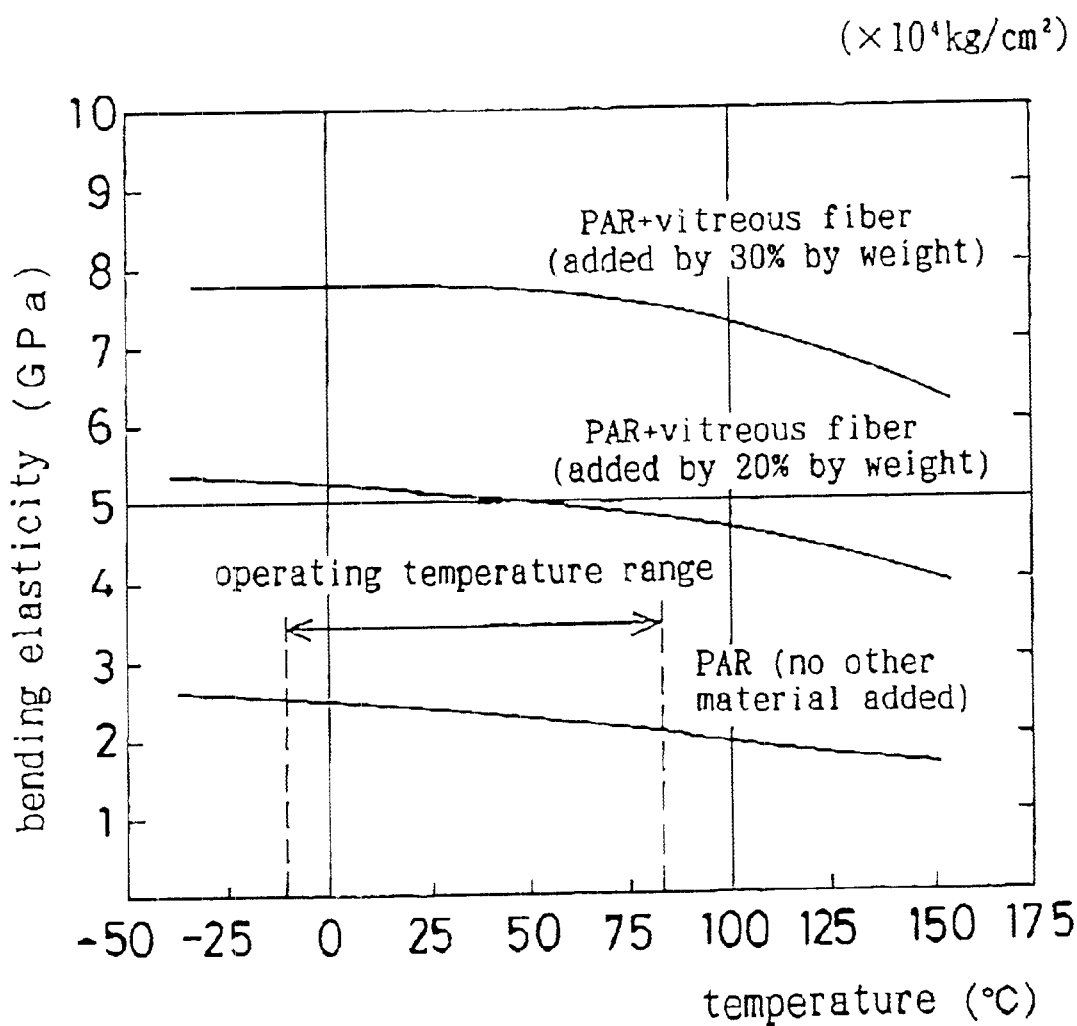
FIG. 13 is a characteristics showing a relationship between a bending elasticity and temperature on the synthetic resins in which a changing rate of the bending elasticity is relatively small.
Figure 14:
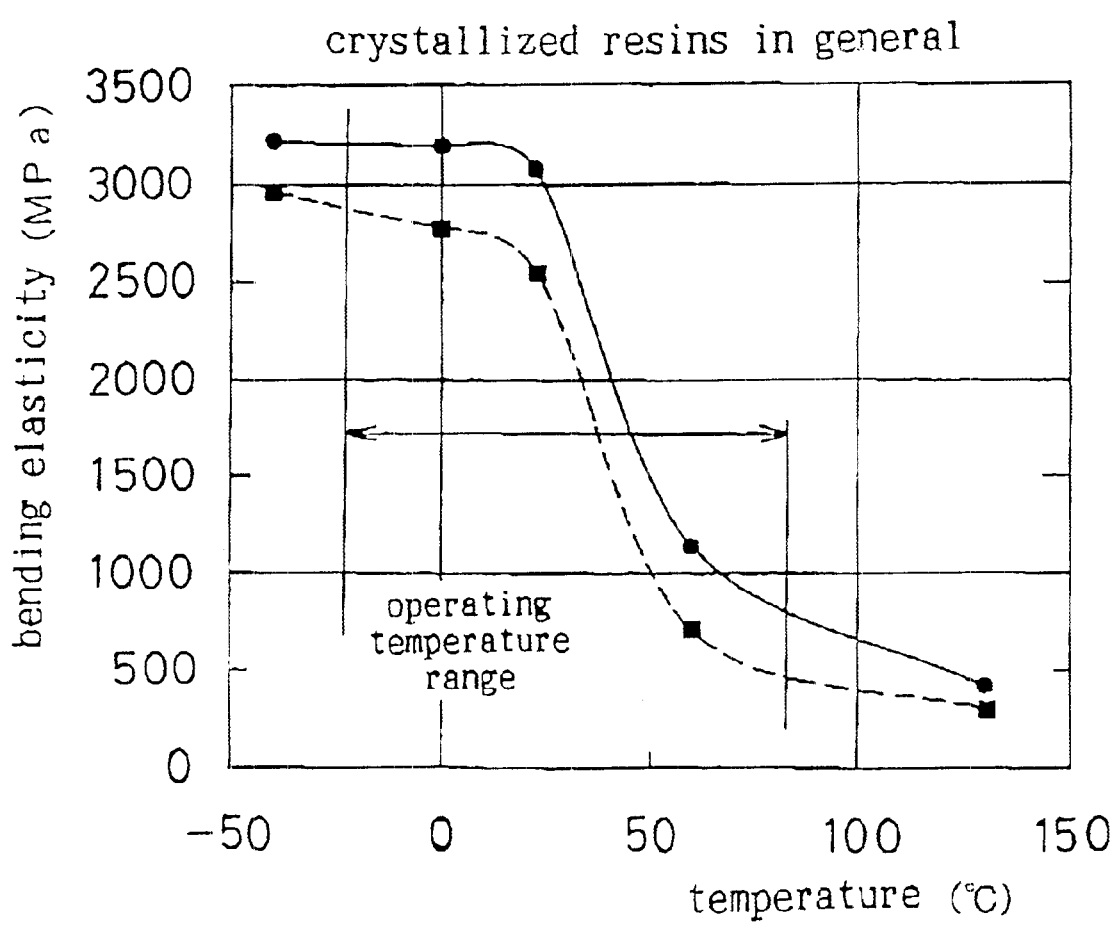
FIG. 14 is a characteristics showing a relationship between the bending elasticity and temperature on crystallized resins in general for the purpose of comparing with FIG. 13.

FIGS. 13, 14 show a relationship between the bending elasticity and the ambient temperature. As depicted in FIG. 13, PAR is suited to the synthetic resin for the support block 20 from the reason that the bending elasticity does not change significantly under the ambient temperature in which the personal computer 30 is placed. In the crystallized resins usually used in general, the bending elasticity changes greatly under the operating temperature as shown in FIG. 14. These crystallized resins are not suited for the support block 20 because they can not afford enough surface friction against the rotation shaft 10.

With this in mind, the suitable resins for the support block 20 are PAR (polyarylate), PC (polycarbonate), PPS (polyphenylene sulphide), PES (polyether sulfone) and PEEK (polyether ether ketone).

As a second embodiment of the invention, added to the above resin is an organic based antifriction medium (within 10% by weight) such as fluoro-based resin, carbon, carbon fiber and olefine-based resin in combination or alone.

Alternatively, an inorganic based antifriction medium (within 10% by weight) such as molybdate bisulfide and potassium titanate may be added to the above resin in combination or alone.

Figure 15:
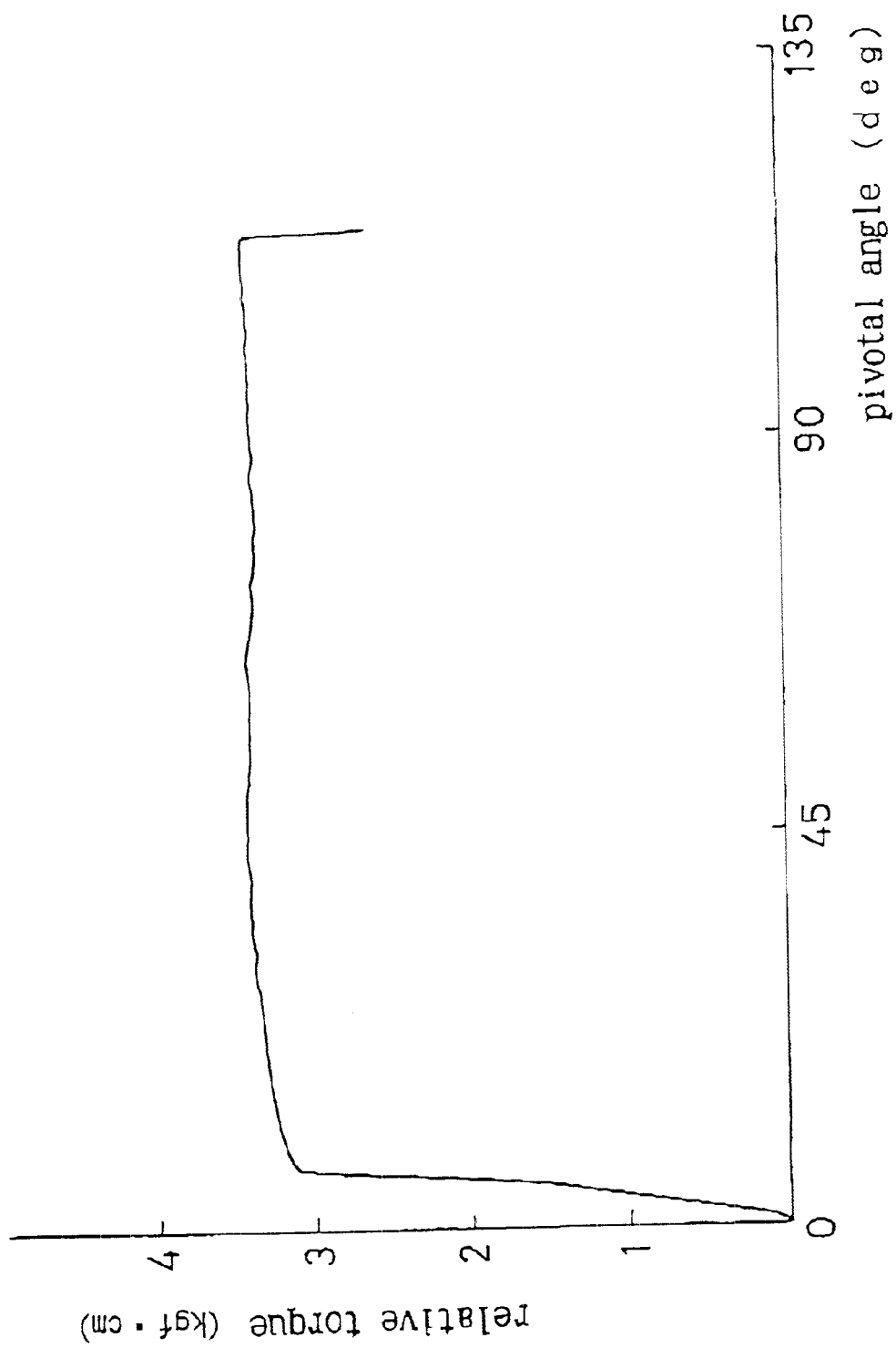
FIG. 15 is a characteristics showing a relationship between the pivotal angle and torque according to a second embodiment of the invention when an antifriction medium is added to the synthetic resin of a support member.
Figure 16:
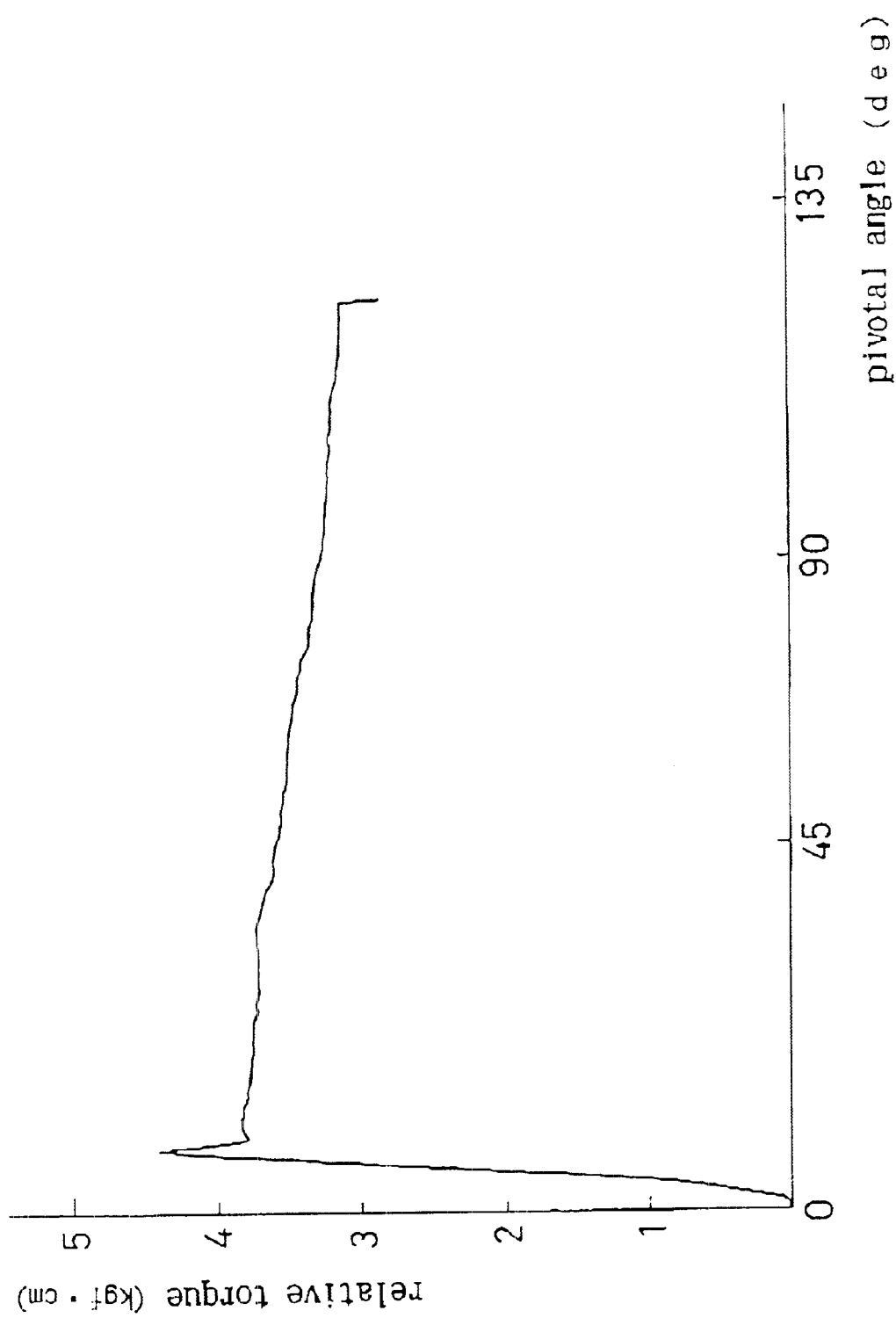
FIG. 16 is a characteristics showing a relationship between the pivotal angle and torque in parallel with FIG. 15 when an antifriction medium is not added to the synthetic resin of the support member.

By comparing FIG. 15 in which PTFE (polytetrafluoro ethylene) is added by 3% by weight to the synthetic resin and FIG. 16 in which PTFE is not added, it is found that the rotation shaft 10 starts to pivot smoothly when PTFE is added. This substantially reduces an amount of the wear dust due to the friction between the rotation shaft 10 and the support block 20.

Figure 17:
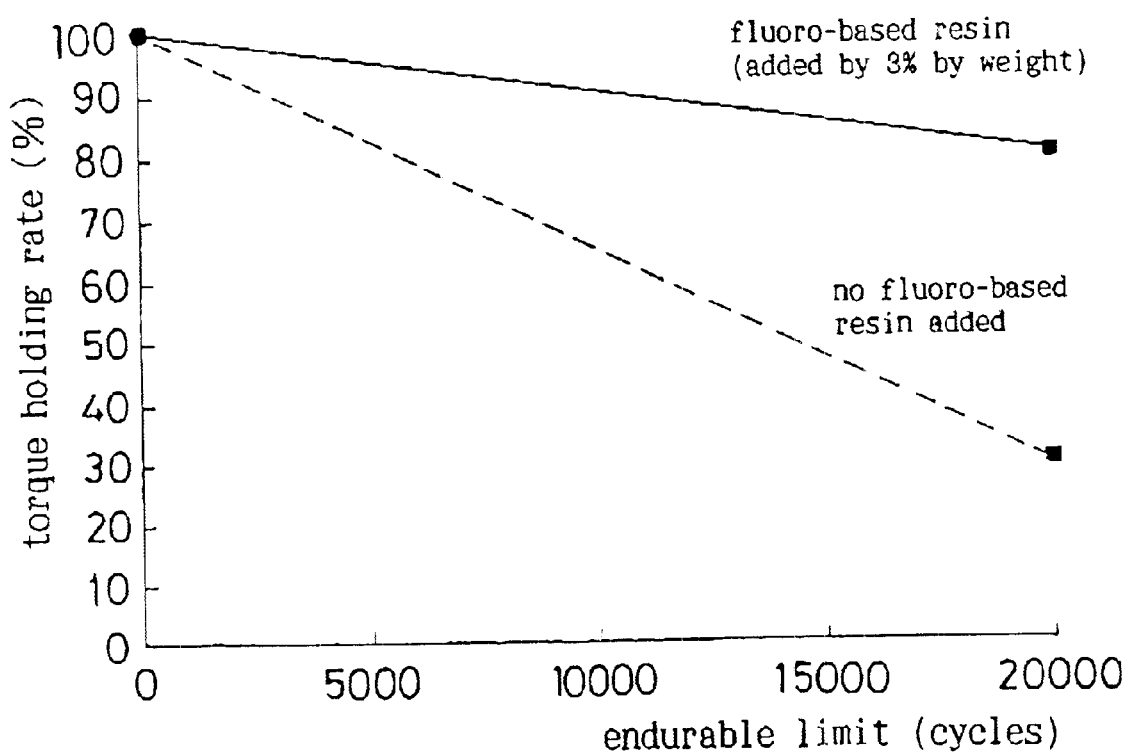
FIG. 17 is a characteristics showing a relationship between an endurable limit and a change of torque to compare when the antifriction medium is added and not added to the synthetic resin of the support member.

FIG. 17 compares the endurance in which the antifriction medium is added and the endurance in which the antifriction medium is not added. When the antifriction medium is added, the torque holding rate declines almost inappreciably, thereby leading to a long period of service life.

As a third embodiment of the invention, added to the synthetic resin is mineral, vitreous fiber, carbon fiber or the like within 40% by weight so as to impart the support block 20 with a sufficient mechanical strength when forming the support block 20 in integral with the rotation shaft 10.

As understood from the foregoing description, the rotation shaft 10 is finished so that the surface roughness (Ra) is 0.15~0.30 µm. This avoids the stickslip and the initial scratch against the support block 20 when the rotation shaft 10 starts to pivot around the support block 20, thereby maintaining the stable surface friction between the rotation shaft 10 and the support block 20.

From the reason that the surface roughness (Ra) is 0.05~0.20 µm in the circumferential direction which is smaller by 0.1~0.2 µm than the surface roughness (Ra) in the axial direction, the torque holding rate decreases to maintain the stable torque between the rotation shaft 10 and the support block 20. This enables users to hold the lid plate 31 at any pivotal positions with ease.

With the support block 20 and the shaft 10 molded integrally, the frictional hinge device 1 is manufactured less costly.

With the resin used to the support block 20 in which the changing rate of the bending elasticity is relatively small under the operating temperature range, the stable surface friction is maintained even under the fluctuating ambient temperatures, thereby maintaining a stable surface friction so as to render the lid-mounted business machine more user-friendly.

In the above embodiments of the invention, the surface treatment is implemented to determine the surface roughness (Ra). However, the surface treatment is implemented at the time when forming the rotation shaft 10 (e.g., form rolling) so that the surface roughness (Ra) is 0.05~0.20 µm in the circumferential direction, and the surface roughness (Ra) in the axial direction is 0.15~0.30 µm.

It is to be noted that Ni—P plating or hard Cr plating (5~15 µm in thickness) may be coated on the rotation shaft for the purpose of antirust and durability. Then, the coated surface of the rotation shaft may be subjected to the surface treatment.

It is to be observed that instead of the lid plate of the laptop note type personal computer, the frictional hinge device may be applied to a lid plate for a copy machine, a porcelain toilet, an automobile hatch, hood or the like.

While there has been described what is at present thought to be preferred embodiments of the invention, it will be understood that modifications may be made therein and it is intended to cover in the appended claims all such modifications which fall within the scope of the invention.

What is claimed is:

1. A frictional hinge device comprising:

a shaft member having a rotational axis as a rotational center;

a support member which rotationally supports said shaft member, said support member being made of a synthetic resin molded around said shaft member integral therewith so that said shaft member can rotate accompanied with a surface frictional resistance between said support member and said shaft member due to a shrinkage allowance therebetween;

said shaft member having such a deviation from a geometrical circular form as expressed by P-P<2.5 µm and V<1.0 µm; and a surface roughness Ra of said shaft member being 0.15–0.30 µm in an axial direction so as to obtain a torque holding rate of 80% or more of an initial torque when said support member is subjected to repetitive rotational operation, wherein P-P is defined by a difference between an outermost shift position and an innermost shift position with respect to a referential center geometrical circle of an outer surface of said shaft member, and V is a dent of said innermost shift position with respect to a true geometrical circle of the outer surface of said shaft member.

2. A frictional hinge device comprising:

a shaft member having a rotational axis as a rotational center;

a support member which rotationally supports said shaft member, said support member being made of a synthetic resin molded around said shaft member integral therewith so that said shaft member can rotate accompanied with a surface frictional resistance between said support member and said shaft member due to a shrinkage allowance therebetween;

said shaft member having such a surface roughness Ra in a circumferential direction as expressed by Ra=0.05–0.20 µm; and said shaft member further having a surface roughness Ra of 0.15–0.30 µm in an axial direction so as to obtain a torque holding rate of 80% or more of an initial torque when said support member is subjected to repetitive rotational operation.

3. A frictional hinge device comprising:

a shaft member having a rotational axis as a rotational center;

a support member which rotationally supports said shaft member, said support member being made of a synthetic resin molded around said shaft member integral therewith so that said shaft member can rotate accompanied with a surface frictional resistance between said support member and said shaft member due to a shrinkage allowance therebetween;

said shaft member having such a deviation from a geometrical circular form as expressed by P-P<2.5 $\mu$m and V<1.0 $\mu$m;

a surface roughness Ra of said shaft member being 0.05–0.20 $\mu$m in a circumferential direction; and a surface roughness Ra of said shaft member being 0.15–0.30 $\mu$m in an axial direction so as to obtain a torque holding rate of 80% or more of an initial torque when said support member is subjected to needed times of repetitive rotational operation, wherein P-P is defined by a difference between an outermost shift position and an innermost shift position with respect to a referential center geometrical circle of an outer surface of said shaft member, and V is a dent of said innermost shift position with respect to a true geometrical circle of the outer surface of said shaft member.

4. A portable business machine into which the frictional hinge device as set forth in any one of claims 1–3 is used to pivotably move a display thereof.

* * * * *